United States Patent [19]

Frank et al.

[11] 4,283,711
[45] Aug. 11, 1981

[54] CROSS-TRACK DISTRIBUTOR FOR VIDEO SIGNALS

[75] Inventors: Dieter Frank, Darmstadt-Eberstadt; Kurt Hennig, Rossdorf, both of Fed. Rep. of Germany

[73] Assignee: Robert Bosch GmbH, Stuttgart, Fed. Rep. of Germany

[21] Appl. No.: 147,209

[22] Filed: May 6, 1980

[30] Foreign Application Priority Data

May 14, 1979 [DE] Fed. Rep. of Germany ....... 2919327

[51] Int. Cl.³ .............................................. H04Q 3/00
[52] U.S. Cl. ......................... 340/166 R; 340/166 EL
[58] Field of Search ................... 340/166 R, 166 EL; 307/254

[56] References Cited

U.S. PATENT DOCUMENTS 3,665,220  5/1972  Legler ................................. 307/254

*Primary Examiner*—Harold I. Pitts
*Attorney, Agent, or Firm*—Frishauf, Holtz, Goodman & Woodward

[57] ABSTRACT

Switching cross-points between input and output video lines each consist of a series connection of oppositely poled diodes to the common connection of which a resistor is connected through which forward current for both diodes is selectively provided through a random access memory (RAM) controlled from a remote location. In the switched-off condition the current drain is negligible, and in the switched-on condition it may be as little as 5 mmA. Low-capacitance diodes make possible the holding of cross-torque to very low levels.

4 Claims, 1 Drawing Figure

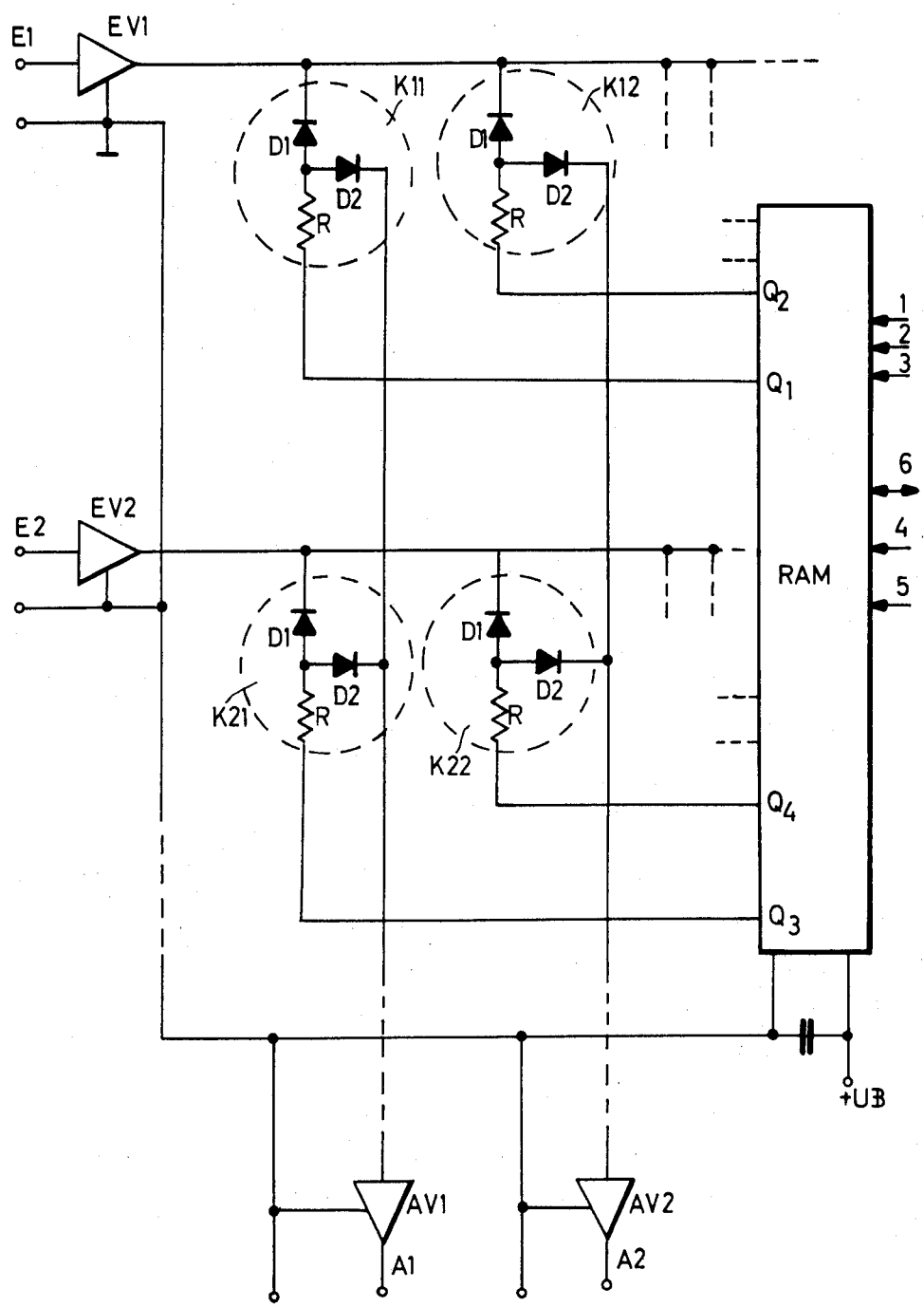

CROSS-TRACK DISTRIBUTOR FOR VIDEO SIGNALS

This invention relates to apparatus for selectively switching any of a number of video signal inputs to any of a number of video signal output channels by means of a switching network in which the input channels run in one direction and the output channels run in another, so as to cross the input channels, and a switch is provided at each of the intersection points of the lattice so formed. Such a system is sometimes referred to as a cross-bar distributor, although the switches used are normally semiconductor switches and not the well-known mechanical switches known as cross-bar switches.

A cross-track distributor for video signals is disclosed in U.S. Pat. No. 3,665,220 to Legler et al., owned by the assignee of the present application, in which each cross-point switch consists of three diodes, three transistor stages and a number of resistances. Not only does this system involve considerable expense for circuit components for each cross-point, but each cross-point requires considerable energy both in the switch-on and in the switch-off condition, because typically about 11 mA of current is required per cross-point. Furthermore, the turning on and off of the cross-points is relatively expensive.

SUMMARY OF THE INVENTION

It is an object of the present invention to provide a cross-track distributor for video signals using fewer components per cross-point, requiring a smaller current supply than the conventional equipment and capable of being controlled at relatively small expense.

Briefly, each cross-point consists essentially of two diodes connected in series in opposite polarity between the input line and the output line of the cross-point, and a resistance is connected to the common connection of the two diodes. A read-write store in the form of a random access memory (RAM) is provided, the outputs of which are connected with the respective resistors of the various cross-points and whose inputs are connected to at least one remote service location.

The diodes are preferably switching diodes having a forward resistance less than 1 ohm and a blocking resistance greater than 30,000 ohms (at the color carrier frequency) and having a capacitance in the blocking condition that is smaller than 1 picofarad. The RAM is preferably controlled by a microprocessor.

The cross-track video distributor of the present invention not only uses fewer components per cross-point of the switching network, but also has reduced current requirements, in a practical case about 5 mA per cross-point. In consequence, cross-track distributors of very many cross-points can be provided which are economical both of space and energy. There is the further advantage that the cross-points require no current whatever in the switched-off condition, thus already with a cross-track distributor of moderate size, for example, a 20 by 10 system (200 cross-points) saves a great deal of energy. With the previously known type of such equipment mentioned above, the steady current drain is 2.2 A, regardless of how many (even zero) cross-points are closed, whereas in the cross-track distributor of the prevent invention the current drain is between 5 mA and a maximum of 1 A, according to the number of switched-on cross-points, and in normal operation usually between 50 and 100 mA.

It is furthermore advantageous that the RAM directly controls the cross-points and is a component of the cross-track distributor. A direct verification of the state of the RAM can be reported back by routine scanning for supervision purposes.

Particularly important is the advantage of the low cross-talk levels resulting from the use at each cross-point of only two diodes having the low capacitance (in the blocked condition) of less than 1 picofarad and also the practically lossless signal transmission resulting from the overall forward resistance of less than 1 ohm.

BRIEF DESCRIPTION OF THE DRAWING

The invention is further described by way of illustrative example, with reference to the annexed drawing, in which the single FIGURE is a circuit diagram of a portion of a cross-track distributor of the present invention comprising four cross-points and the associated amplifiers and controls relating thereto.

DESCRIPTION OF A PREFERRED EMBODIMENT

The cross-track video distributor illustrated in the drawing comprises a number of input lines E1, E2, ... and a number of output lines A1, A2, ... In each input line E1,E2, ... is interposed an input amplifier EV1, EV2, ... and in each output line A1,A2, ... there is similarly interposed an output amplifier AV1, AV2, .... Between each input line E1,E2, ... and each output line A1,A2, ... is a cross-point, the respective cross-points being accordingly designated K11,K12, ... K21,K22, ..., so that each input line can selectively be connected with any one or more of the output lines.

Each cross-point A consists of two oppositely poled diodes D1,D2 connected in series, for example diodes of the type BA 182, and at their point of connection together there is connected a resistor which typically has the value of 2.2 K ohms. Each diode D1 has its cathode connected to an input line, and each diode D2 has its cathode connected to an output line. The resistances R are connected between the diode junction of a cross point and one of the outputs Q1, Q2, Q3, Q4, ... of a read-write storage unit that is preferably a random access memory (RAM), typically an integrated circuit of the type designation MC 14599B. The inputs 1, 2, 3 of the RAM are the address inputs, the input 4 is the write-read input, the input 5 is the "enable" or "unblocking" input and the input 6 is the bi-directional data input for reporting and setting the content of the storage cells. The inputs 1 to 6 are connected, usually through interposition of a microprocessor (not shown) to at least one control and monitoring location (likewise not shown).

The video signals to be switched through the cross-track distributor are supplied to the input lines E1, E2, ... and are led through the input amplifiers EV1, EV2, ..., the cross-points K11, K12, ..., K21, K22, ... If now a signal of a particular input line is to be switched to one or more output lines, there is supplied to the corresponding low-resistance output Q of the RAM a forward current sufficient for the diodes of the corresponding cross-point, through the resistance R of that cross-point. A connection from the input line to the output line or lines is thereby established for the video frequencies over the now conducting diode paths. At the output of the corresponding output amplifier or amplifiers AV, the signal that has passed through the network is then available.

The resistance R simultaneously decouples the lines carrying video signals in the switched-on condition of the cross-point from the control leads connected to the outputs Q of the cross-point. In the switched-off condition of the cross-point K, the resistor R cuts down the cross-talk level of each first diode V1 at the low Ohm Value RAM output, so that a good overall cross-torque suppression is obtainable.

Although the invention has been described with reference to a specific example, it must be understood that the resistance values and component types given as typical are merely illustrative, and that variations are possible within the inventive concept. For example in some applications it may be suitable to connect the cathodes of the paired diodes together, with use of switch-on current of the proper polarity to cause the diodes to conduct in that case (the polarity opposite to that utilized in the case illustrated herein).

We claim:

1. A cross-track distributor for video signals for transferring signals from any one or more of several input lines to any one or more of several output lines through crosspoint switches, comprising the improvement in that:

each crosspoint switch consists essentially of a pair of oppositely poled diodes connected in series between the input and output lines of the respective crosspoint and a resistor connected between the common connection of said diodes of said pair and a controllably switched source of current;

said controllably switched source of current comprises controllable read-write storage means of the random access memory type having outputs connected to the respective resistors of the crosspoints and having at least addressing and read-write inputs connected to at least one remotely located control and monitoring means.

2. A cross-track distributor as defined in claim 1, in which said diodes (D1,D2) of each crosspoint switch are switching diodes having a forward resistance not greater than one ohm, a blocking-condition resistance at color television carrier frequency exceeding 30,000 ohms and a blocking-condition capacitance not greater than one picofarad.

3. A cross-track distributor as defined in claim 2, in which the anodes of the diodes of each said pair are connected together.

4. A cross-track distributor as defined in claim 1, in which a microprocessor is interposed on the input side of said read-write storage means for control of the latter.

* * * * *